United States Patent
Oprea et al.

(10) Patent No.: US 9,674,210 B1
(45) Date of Patent: Jun. 6, 2017

(54) DETERMINING RISK OF MALWARE INFECTION IN ENTERPRISE HOSTS

(71) Applicants: EMC Corporation, Hopkinton, MA (US); The University of North Carolina at Chapel Hill, Chapel Hill, NC (US)

(72) Inventors: Alina M. Oprea, Arlington, MA (US); Ting-Fang Yen, Waltham, MA (US); Viktor Heorhiadi, Chapel Hill, NC (US); Michael Kendrick Reiter, Chapel Hill, NC (US); Ari Juels, Brookline, MA (US)

(73) Assignees: EMC IP Holding Company LLC, Hopkinton, MA (US); University of North Carolina at Chapel Hill, Chapel Hill, NC (US)

( * ) Notice: Subject to any disclaimer, the term of this patent is extended or adjusted under 35 U.S.C. 154(b) by 192 days.

(21) Appl. No.: 14/554,492

(22) Filed: Nov. 26, 2014

(51) Int. Cl.
*G06F 21/00* (2013.01)
*G06F 21/56* (2013.01)
(Continued)

(52) U.S. Cl.
CPC ...... *H04L 63/1425* (2013.01); *H04L 63/0272* (2013.01); *H04L 67/22* (2013.01)

(58) Field of Classification Search
CPC ... H04L 63/20; H04L 63/104; H04L 63/1408; H04L 63/1416; H04L 63/1433;
(Continued)

(56) References Cited

U.S. PATENT DOCUMENTS 6,959,319 B1 * 10/2005 Huang .............. G06F 17/30867
705/14.73
8,181,253 B1  5/2012 Zaitsev et al.
(Continued)

OTHER PUBLICATIONS

C.-M. Chen et al., "Detecting Hybrid Botnets with Web Command and Control Servers or Fast Flux Domain," Journal of Information Hiding and Multimedia Signal Processing, Apr. 2014, pp. 263-274, vol. 5, No. 2.
(Continued)

*Primary Examiner* — Joseph R Hirl
*Assistant Examiner* — Kalish Bell
(74) *Attorney, Agent, or Firm* — Ryan, Mason & Lewis, LLP

(57) ABSTRACT

A processing device comprises a processor coupled to a memory and is configured to obtain data characterizing host devices of a computer network of an enterprise. The data is applied to a logistic regression model to generate malware infection risk scores for respective ones of the host devices. The malware infection risk scores indicate likelihoods that the respective host devices will become infected with malware. The logistic regression model incorporates features of the host devices including at least user demographic features, virtual private network (VPN) activity features and web activity features of the host devices, and the data characterizing the host devices comprises data for the incorporated features. Proactive measures are taken to prevent malware infection in a subset of the host devices based at least in part on the malware infection risk scores. The processing device may be implemented in the computer network or an associated network security system.

20 Claims, 6 Drawing Sheets

(51) Int. Cl.
*H04L 29/06* (2006.01)
*H04L 29/08* (2006.01)

(58) Field of Classification Search
CPC ........... H04L 63/1441; H04L 2463/144; G06F 21/00; G06F 21/56; G06F 21/552; G06F 21/577
USPC ................................ 726/1–3, 11, 22–27, 30
See application file for complete search history.

(56) References Cited

U.S. PATENT DOCUMENTS

| | | | |
|---|---|---|---|
| 8,370,947 B2 | 2/2013 | Zaitsev et al. | |
| 8,413,247 B2 | 4/2013 | Hudis et al. | |
| 8,516,585 B2 | 8/2013 | Cao et al. | |
| 8,539,577 B1 | 9/2013 | Stewart et al. | |
| 8,661,544 B2 | 2/2014 | Yen et al. | |
| 8,776,168 B1* | 7/2014 | Gibson ................. | H04L 63/104 709/225 |
| 8,782,782 B1 | 7/2014 | Dicovitsky et al. | |
| 2008/0229421 A1* | 9/2008 | Hudis ................. | H04L 63/1433 726/25 |
| 2009/0174551 A1* | 7/2009 | Quinn ................... | G06F 21/552 340/540 |
| 2009/0328209 A1* | 12/2009 | Nachenberg ........... | G06Q 10/10 726/22 |
| 2010/0125911 A1* | 5/2010 | Bhaskaran ............. | G06Q 10/10 726/23 |
| 2010/0235915 A1 | 9/2010 | Memon et al. | |
| 2012/0185945 A1 | 7/2012 | Andres et al. | |

OTHER PUBLICATIONS

C.-M. Chen et al., "Detection of Fast-Flux Domains," Journal of Advances in Computer Networks, Jun. 2013, pp. 148-152, vol. 1, No. 2.
L. Bilge et al., "Exposure: a Passive DNS Analysis Service to Detect and Report Malicious Domains," ACM Transactions on Information and System Security (TISSEC), Article No. 14, Apr. 2014, pp. 1-28, vol. 16, No. 4.
E. Passerini et al., "FluXOR: Detecting and Monitoring Fast-Flux Service Networks," 5th International Conference on Detection of Intrusions and Malware, and Vulnerability Assessment (DIMVA), Jul. 2008, pp. 186-206, Paris, France.
A. Caglayan et al., "Real-Time Detection of Fast Flux Service Networks," Cybersecurity Applications & Technology Conference for Homeland Security (CATCH), Mar. 2009, pp. 285-292.
S. Martinez-Bea et al., "Real-Time Malicious Fast-Flux Detection Using DNS and Bot Related Features," 11th Annual International Conference on Privacy, Security and Trust (PST), Jul. 2013, pp. 369-372, Tarragona, Catalonia, Spain.
RSA Security Analytics, "Detect & Investigate Threats." Data Sheet, Oct. 2013, 6 pages.
W. Xu et al., "New Trends in FastFlux Networks," https://media.blackhat.com/us-13/US-13-Xu-New-Trends-in-FastFlux-Networks-WP.pdf, 2013, 5 pages.
T. Holz et al., "Measuring and Detecting Fast-Flux Service Networks," Proceedings of the Network and Distributed System Security Symposium (NDSS), Feb. 2008, 12 pages.
R. Perdisci et al., "Detecting Malicious Flux Service Networks Through Passive Analysis of Recursive DNS Traces," Annual Computer Security Applications Conference (ACSAC), Dec. 2009, pp. 311-320.
R. Perdisci et al., "Early Detection of Malicious Flux Networks via Large-Scale Passive DNS Traffic Analysis," IEEE Transactions on Dependable & Secure Computing, Sep. 2012, pp. 714-726, vol. 9, No. 5.
Wikipedia, "Reserved IP Addresses," http://en.wikipedia.org/wiki/Reserved_IP_addresses, Jul. 2014, 5 pages.
T.-F. Yen et al., "An Epidemiological Study of Malware Encounters in a Large Enterprise," 21st ACM Conference on Computer and Communications Security (CCS), Nov. 3-7, 2014, 14 pages.
C. Gates et al., "Scan Detection on Very Large Networks Using Logistic Regression Modeling," Proceedings of the 11th IEEE Symposium on Computers and Communications (ISCC), Jun. 2006, pp. 402-408, Cagliari, Italy.
J.Y.J. Pan, "Fighting Fire with Fire—a Pre-Emptive Approach to Restore Control Over IT Assets from Malware Infection," Murdoch University, Thesis, Nov. 2012, 264 pages.
Y. Wang, "A Multinomial Logistic Regression Modeling Approach for Anomaly Intrusion Detection," Computers and Security, Nov. 2005, pp. 662-674, vol. 24, No. 8.
Merriam-Webster, "Epidemiology," m-w.com, May 2014, 6 pages.
J. Caballero et al., "Measuring Pay-Per-Install: The Commoditization of Malware Distribution," Proceedings of the 20th USENIX Security Symposium, Aug. 2011, pp. 187-202.
D. Canali et al., "On the Effectiveness of Risk Prediction Based on Users Browsing Behavior," Proceedings of the 9th ACM Symposium on Information, Computer and Communications Security, Jun. 2014, pp. 171-182.
Y. Carlinet et al., "Analysis of Computer Infection Risk Factors Based on Customer Network Usage," Proceedings of the Second International Conference on Emerging Security Information, Systems and Technologies (SECURWARE), Aug. 2008, pp. 317-325, Cap Esterel, France.
M.P. Collins et al., "Using Uncleanliness to Predict Future Botnet Addresses," Proceedings of the 7th ACM SIGCOMM Conference on Internet Measurement, Oct. 2007, pp. 93-104.
D.J. Daley et al., "Epidemic Modelling: An Introduction," American Journal of Epidemiology, 2000, pp. 835-836, vol. 151, No. 8.
A. Kleiner et al., "Linking Cybersecurity Policy and Performance," Microsoft Trustworthy Computing, 2013, 27 pages.
M.W. Kreuter et al., "Tailored and Targeted Health Communication: Strategies for Enhancing Information Relevance," American Journal of Health Behavior, Nov.-Dec. 2003, pp. S227-S232, vol. 27, No. 3.
M. Lee, "Who's Next? Identifying Risk Factors for Subjects of Targeted Attacks," 22nd Virus Bulletin International Conference, Sep. 2012, pp. 301-306.
F.L. Lévesque et al., "A Clinical Study of Risk Factors Related to Malware Infections," Proceedings of the ACM SIGSAC Conference on Computer and Communications Security, Nov. 2013, pp. 97-108.
G. Maier et al., "An Assessment of Overt Malicious Activity Manifest in Residential Networks," Proceedings of the 8th International Conference on Detection of Intrusions and Malware, and Vulnerability Assessment (DIMVA), Lecture Notes in Computer Science, Jul. 2011, pp. 144-163, vol. 6739, Amsterdam, The Netherlands.
Microsoft, "Microsoft Security Intelligence Report," Jan.-Jun. 2011, 168 pages, vol. 11.
Microsoft, "Microsoft Security Intelligence Report," Jul.-Dec. 2011, 138 pages, vol. 12.
Microsoft, "Microsoft Security Intelligence Report," Jan.-Jun. 2013, 160 pages, vol. 15.
Microsoft, "Microsoft Security Intelligence Report," Jul.-Dec. 2013, 152 pages, vol. 16.
G.R. Milne et al., "Toward an Understanding of the Online Consumer's Risky Behavior and Protection Practices," The Journal of Consumer Affairs, Sep. 2009, pp. 449-473, vol. 43, No. 3.
F.T. Ngo et al., "Cybercrime Victimization: An Examination of Individual and Situational Level Factors," International Journal of Cyber Criminology, Jan.-Jul. 2011, pp. 773-793, vol. 5, No. 1.
K. Onarlioglu et al., "Insights into User Behavior in Dealing with Internet Attacks," 19th Annual Network and Distributed System Security Symposium (NDSS), Feb. 2012, 14 pages.
A. Ramachandran et al., "Understanding the Network-Level Behavior of Spammers," ACM SIGCOMM Computer Communication Review, Sep. 2006, pp. 291-302, vol. 36, No. 4, Pisa, Italy.
S. Sheng et al., "Who Falls for Phish? A Demographic Analysis of Phishing Susceptibility and Effectiveness of Interventions," Proceedings of the SIGCHI Conference on Human Factors in Computing Systems, Apr. 2010, pp. 373-382.

(56) References Cited

OTHER PUBLICATIONS

D. Sounthiraraj et al., "SMV-HUNTER: Large Scale, Automated Detection of SSL/TLS Man-in-the-Middle Vulnerabilities in Android Apps," Network and Distributed System Security Symposium (NDSS), Feb. 2014, 14 pages.

Symantec Corporation, "Internet Security Threat Report," http://www.symantec.com/content/en/us/enterprise/other_resources/b-istr_appendices_v18_2012_221284438.en-us.pdf, Apr. 2013, 96 pages, vol. 18.

Y. Xie et al., "Spamming Botnets: Signatures and Characteristics," Proceedings of the ACM SIGCOMM Conference on Data Communication, Aug. 2008, pp. 171-182.

J. Zhang et al., "On the Mismanagement and Maliciousness of Networks," Proceedings of the 21st Annual Network & Distributed System Security Symposium (NDSS), Feb. 2014, 12 pages.

M. Nicolett et al., "Magic Quadrant for Security Information and Event Management," Gartner Research Note G00212454, May 2011, 32 pages.

\* cited by examiner

*FIG. 3*

| FIELD | DESCRIPTION |
|---|---|
| HOST NAME | FULLY-QUALIFIED DOMAIN NAME THAT SERVES AS A UNIQUE IDENTIFIER FOR THE END HOST ON THE ENTERPRISE NETWORK |
| VIRUS NAME | NAME OF THE IDENTIFIED THREAT |
| FILE PATH | FULL PATH OF THE MALICIOUS FILE |
| DETECTION TIME | TIME OF DETECTION ON THE END HOST |
| REPORTING TIME | TIME OF COLLECTION AT THE ENTERPRISE DATA COLLECTION SERVER |

FIG. 4

| FEATURE | VALUE | EST. | ERROR | p-VALUE | SIGNIF. |
|---|---|---|---|---|---|
| GENDER | MALE | 0.23 | 0.04 | 1.35e-09 | *** |
|  | UNKNOWN | 0.39 | 0.04 | 2e-16 | *** |
| COUNTRY | BRAZIL | 1.01 | 0.13 | 6.82e-15 | *** |
|  | CANADA | 0.05 | 0.13 | 0.67 |  |
|  | CHINA | 0.92 | 0.1 | 2e-16 | *** |
|  | EGYPT | 0.86 | 0.12 | 1.36e-12 | *** |
|  | FRANCE | 0.24 | 0.13 | 0.07 | . |
|  | GERMANY | -0.22 | 0.13 | 0.08 | . |
|  | INDIA | 1.21 | 0.1 | 2e-16 | *** |
|  | IRELAND | -0.24 | 0.11 | 0.03 | * |
|  | ISRAEL | 0.09 | 0.13 | 0.48 |  |
|  | ITALY | 0.37 | 0.14 | 0.01 | ** |
|  | JAPAN | -1.64 | 0.18 | 2e-16 | *** |
|  | KOREA | 1.02 | 0.13 | 2.29e-14 | *** |
|  | MEXICO | 0.87 | 0.15 | 5.02e-09 | *** |
|  | NETHERLANDS | -0.23 | 0.20 | 0.26 |  |
|  | RUSSIA | 0.52 | 0.14 | 3e-04 | *** |
|  | SINGAPORE | 0.19 | 0.14 | 0.18 |  |
|  | SPAIN | 0.57 | 0.15 | e-04 | *** |
|  | UAE | 0.62 | 0.17 | 2e-04 | *** |
|  | UK | -0.24 | 0.12 | 0.047 | * |
|  | US | -0.02 | 0.09 | 0.79 |  |
|  | OTHER | 0.52 | 0.10 | 3.23e-07 | *** |
| LEVELS |  | 0.15 | 0.01 | 2e-16 | *** |
| TECHNICAL |  | 0.08 | 0.02 | 7e-04 | *** |

FIG. 5

| FEATURE | EST. | ERROR | p-VALUE | SIGNIF. |
|---|---|---|---|---|
| VPN_conn | 4.47e-03 | 3.22e-04 | 2e-16 | *** |
| VPN_dur | -8.54e-08 | 8.21e-09 | 2e-16 | *** |
| VPN_sbytes | 9.65e-12 | 1.41e-12 | 6.96e-12 | *** |
| VPN_rbytes | 1.38e-13 | 2.08e-12 | 0.947 |  |
| VPN_extip | 1.73e-02 | 6.62e-04 | 2e-16 | *** |

FIG. 6

| CATEGORY | EST. | ERROR | p-VALUE | SIGNIF. |
|---|---|---|---|---|
| CHAT | 1.1e−05 | 2.8e−06 | 8.84e−05 | *** |
| ENTERTAINMENT | 2.01e−08 | 7.4e−07 | 0.98 | |
| FILE TRANSFER | 3.62e−06 | 1.1e−06 | 9.8e−04 | *** |
| FILTERING | 2.12e−04 | 2.03e−04 | 0.3 | |
| FREEWARE | 2.05e−06 | 6.44e−07 | 1.4e−03 | ** |
| GAMING | 1.27e−05 | 6.48e−06 | 0.05 | . |
| ONLINE STORAGE | −3.7e−08 | e−07 | 0.71 | |
| PEER-TO-PEER | 2.09e−07 | 2.57e−06 | 0.94 | |
| SOCIAL NETWORKS | 4.54e−06 | 1.04e−06 | 1.36e−05 | *** |
| ONLINE MAIL | 6.45e−07 | 5.05e−07 | 0.20 | |
| STREAMING | 4.48e−07 | 1.93e−07 | 0.02 | * |
| BUSINESS | 2.44e−07 | 2.59e−07 | 0.35 | |
| TRAVEL | 1.74e−06 | 1.11e−06 | 0.12 | |
| NON-CATEGORIZED | 4.49e−06 | 8.98e−07 | 5.65e−07 | *** |

FIG. 7

| CATEGORY | EST. | ERROR | p-VALUE | SIGNIF. |
|---|---|---|---|---|
| No_conn | 2.14e−08 | 1.82e−08 | 0.24 | |
| No_doms | 1.84e−06 | 2.405e−07 | 2.07e−14 | *** |
| rbytes | 3.83e−13 | 9.47e−13 | 0.69 | |
| sbytes | −6.82e−13 | 5.91e−13 | 0.24 | |

FIG. 8

| CATEGORY | EST. | ERROR | p-VALUE | SIGNIF. |
|---|---|---|---|---|
| BLOCKED | 1.02e−06 | 3.05e−07 | 8.1e−04 | *** |
| CHALLENGED | 7.75e−06 | 1.59e−06 | 1.04e−06 | *** |
| CONSENTED | 2.85e−03 | 3.46e−04 | 2e−16 | *** |
| New_domains | 8.25e−04 | 1.6e−04 | 2.56e−07 | *** |

FIG. 9

| CATEGORY | FEATURE | DESCRIPTION |
|---|---|---|
| DEMOGRAPHIC | GENDER | GENDER OF USER |
| | COUNTRY | COUNTRY OF USER'S OFFICE |
| | LEVEL | LEVEL IN MANAGEMENT HIERARCHY |
| | TECHNICAL | TECHNICAL LEVEL |
| VPN | VPN_conn | TOTAL NO. VPN CONNECTIONS |
| | VPN_dur | DURATION OF VPN CONNECTIONS |
| | VPN_sbytes | BYTES SENT IN VPN CONNECTIONS |
| | VPN_extip | NO. EXTERNAL IPs CONNECTING TO VPN |
| WEB | CHAT | NO. CHAT SITES VISITED |
| | FILE TRANSFER | NO. FILE-TRANSFERS SITES VISITED |
| | FREEWARE | NO. FREEWARE SITES VISITED |
| | GAMES | NO. GAMING/GAMBLING SITES VISITED |
| | SOCIAL NETWORKS | NO. SOCIAL-NETWORKING SITES VISITED |
| | STREAMING | NO. STREAMING SITES VISITED |
| | NON-CATEGORIZED | NO. NON-CATEGORIZED SITES VISITED |
| | No_doms | NO. DISTINCT DOMAINS VISITED |
| | BLOCKED | NO. CONNECTIONS BLOCKED BY PROXY |
| | CHALLENGED | NO. CONNECTIONS CHALLENGED BY PROXY |
| | CONSENTED | NO. CONNECTION CONSENTED BY PROXY |
| | New_domains | NO. NEW DOMAINS VISITED |

DETERMINING RISK OF MALWARE INFECTION IN ENTERPRISE HOSTS

STATEMENT REGARDING FEDERALLY SPONSORED RESEARCH

This invention was made with Government support under Grant No. 0831245 awarded by the National Science Foundation. The Government has certain rights in the invention.

FIELD

The field relates generally to computer networks, and more particularly to techniques for providing security in a computer network.

BACKGROUND

Computer networks are often configured to incorporate network security systems in order to protect the networks against malicious activity. Such malicious activity can include, for example, deployment of malware that is utilized by attackers to create networks of compromised computers or "botnets."

Network security systems can be designed to protect a computer network of a large enterprise comprising many thousands of host devices, also referred to herein as simply "hosts." However, enterprise computer networks are in many cases continuously growing in size, and often incorporate a diverse array of host devices, including mobile telephones, laptop computers and tablet computers. This continuous growth can make it increasingly difficult to provide a desired level of protection using the limited resources of the network security system. For example, available network security system functionality such as processing of security alerts and deployment of memory analysis tools on host devices can be strained by the demands of large enterprise networks.

SUMMARY

Illustrative embodiments of the invention advantageously provide techniques for accurate and efficient determination of risk of malware infection in enterprise hosts. For example, certain embodiments determine malware infection risk scores for respective host devices utilizing a logistic regression model that incorporates user demographic features, virtual private network (VPN) activity features and web activity features of the host devices, although other types of models and feature sets can additionally or alternatively be used in other embodiments. Using malware infection risk scores determined in this manner, a network security system can prioritize its available proactive measures in a manner that conserves limited resources, resulting in improved performance and enhanced security.

In one embodiment, a processing device comprises a processor coupled to a memory and is configured to obtain data characterizing host devices of a computer network of an enterprise. The data is applied to a logistic regression model to generate malware infection risk scores for respective ones of the host devices. The malware infection risk scores indicate likelihoods that the respective host devices will become infected with malware. The logistic regression model incorporates a plurality of features of the host devices including at least user demographic features, VPN activity features and web activity features of the host devices, and the data characterizing the host devices comprises data for the plurality of features incorporated by the logistic regression model. One or more proactive measures are taken to prevent malware infection in one or more of the host devices based at least in part on the malware infection risk scores. For example, the proactive measures may be applied to a subset of host devices determined to have malware infection risk scores above a specified threshold.

A given such processing device configured with functionality for determining risk of malware infection may be implemented, for example, in one or more network devices of a computer network, or in a security analytics system or other type of network security system associated with the computer network.

Other embodiments include, without limitation, methods, apparatus, networks, systems and articles of manufacture comprising processor-readable storage media.

BRIEF DESCRIPTION OF THE DRAWINGS

FIG. 3 shows example data that may be obtained from anti-virus logs in an illustrative embodiment.

FIGS. 4 and 5 show example sets of user demographic and VPN activity features that may be utilized to generate a logistic regression model in an illustrative embodiment.

FIGS. 6, 7 and 8 show example sets of web activity features that may be utilized to generate a logistic regression model in an illustrative embodiment.

FIG. 9 shows particular user demographic, VPN activity and web activity features selected from the potential features of FIGS. 4 through 8 for use in generating a logistic regression model in an illustrative embodiment.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
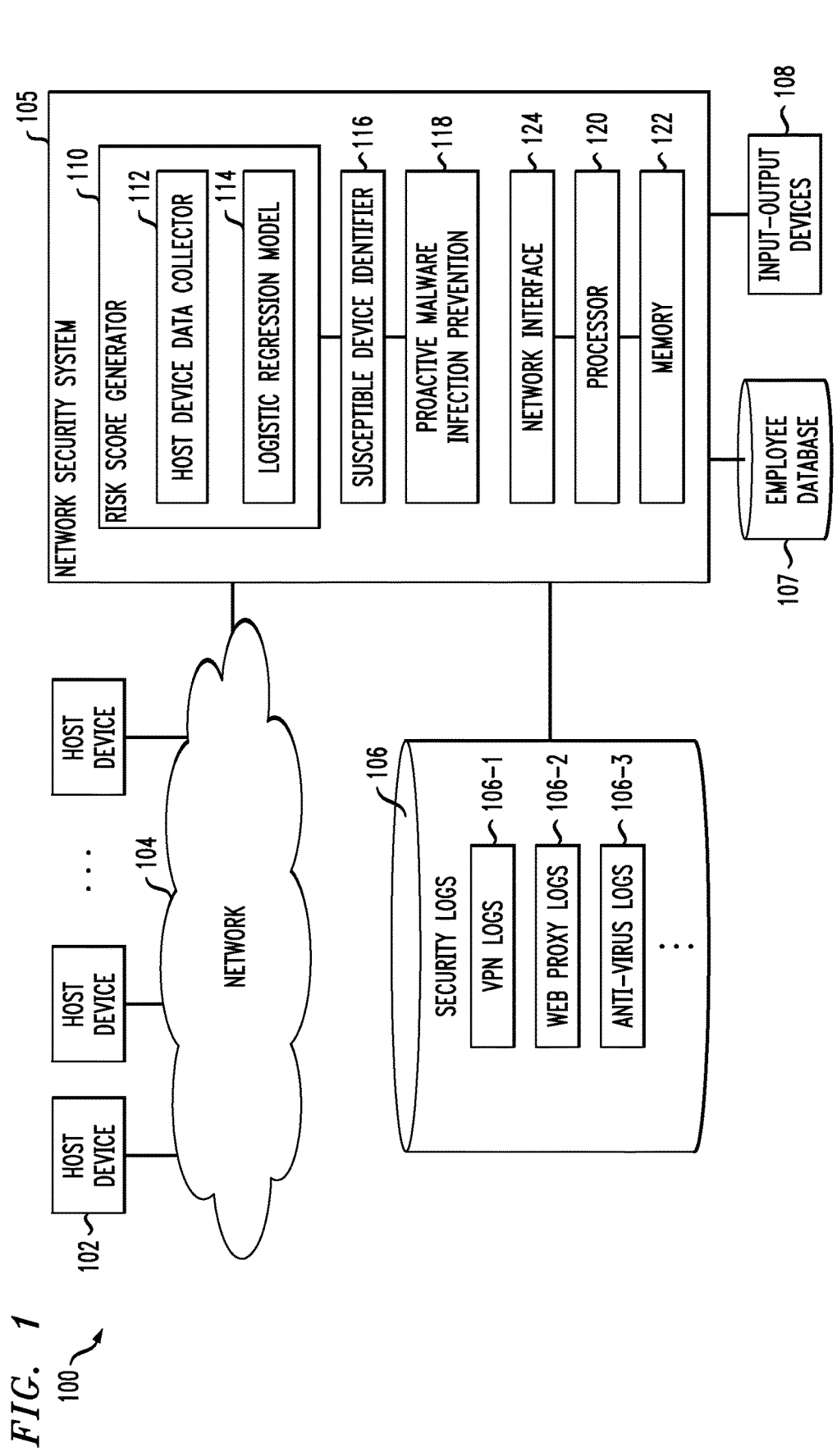
FIG. 1 shows a computer network configured to determine risk of malware infection in enterprise hosts in an illustrative embodiment of the invention.

FIG. 1 shows a computer network 100 configured in accordance with an illustrative embodiment of the invention. The computer network 100 comprises a plurality of host devices 102. The host devices are coupled to a network 104. The host devices 102 may comprise, for example, client devices, web servers, network appliances or other types of devices, in any combination. Such devices are examples of what are more generally referred to herein as "processing devices."

It is assumed that the host devices 102 comprise respective computers associated with a particular company, organization or other enterprise. The host devices 102 are therefore also referred to herein as "enterprise hosts" or simply as "hosts." Also, the computer network 100 is referred to as an "enterprise network." Numerous other operating scenarios involving a wide variety of different types and arrangements of processing devices and networks are possible, as will be appreciated by those skilled in the art.

The network 104 is assumed to comprise a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising network devices configured to communicate using IP or other related communication protocols.

The computer network 100 further comprises a network security system 105 coupled to the network 104. The network security system 105 has associated storage devices which include storage devices configured to store security logs 106 and an employee database 107. The security logs 106 illustratively include VPN logs 106-1, web proxy logs 106-2 and anti-virus logs 106-3, although additional or alternative logs may be used in other embodiments. The storage devices associated with the network security system 105 may comprise, for example, storage products such as VNX® and Symmetrix VMAX®, both commercially available from EMC Corporation of Hopkinton, Mass. A variety of other storage products may be utilized to implement at least a portion of the storage devices.

Also associated with the network security system 105 are input-output devices 108, which illustratively comprise keyboards, displays or other types of input-output devices in any combination. Such input-output devices are used to support one or more user interfaces to the network security system 105, as well as to support communication between the network security system 105 and other related systems and devices not explicitly shown.

The network security system 105 further comprises a risk score generator 110. The risk score generator 110 is configured to facilitate the prevention of malware infection in the host devices 102 by determining malware infection risk scores for respective ones of the host devices 102 such that proactive preventive measures can be implemented based at least in part on the determined risk scores. For example, the malware infection risk scores provided by the risk score generator 110 are illustratively utilized to identify particular ones of the host devices 102 that are most in danger of being infected with malware such that limited resources of the network security system 105 available for proactive prevention can be more intelligently and effectively deployed in the computer network 100.

The risk score generator 110 in this embodiment comprises a host device data collector 112 and a logistic regression model 114, and is configured to interact with a susceptible device identifier 116 coupled to a proactive malware infection prevention module 118. It is to be appreciated that this particular arrangement of modules is presented by way of example only, and alternative arrangements can be used in other embodiments. For example, the functionality associated with the modules 112, 114, 116 and 118 in other embodiments can be combined into a single module, or separated across a larger number of modules.

The network security system 105 in the FIG. 1 embodiment is assumed to be implemented using at least one processing device. Each such processing device generally comprises at least one processor and an associated memory, and implements one or more functional modules for controlling certain features of the network security system 105.

More particularly, the network security system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture comprises, for example, a storage device such as a storage disk, a storage array or an integrated circuit containing memory. The term "article of manufacture" as used herein should be understood to exclude transitory, propagating signals.

The network interface 124 allows the network security system 105 to communicate over the network 104 with the host devices 102, and illustratively comprises one or more conventional transceivers.

At least portions of the risk score generator 110, such as portions of one or more of host device data collector 112 and logistic regression model 114, and additionally or alternatively at least portions of one or both of the susceptible device identifier 116 and the proactive malware infection prevention module 118, may be implemented at least in part in the form of software that is stored in memory 122 and executed by processor 120.

It is to be understood that the particular set of elements shown in FIG. 1 for determining risk of malware infection in host devices 102 of computer network 100 and proactively addressing that risk is presented by way of illustrative example only, and in other embodiments additional or alternative elements may be used. Thus, another embodiment may include additional or alternative systems, devices and other network entities, as well as different arrangements of modules and other components.

By way of example, in other embodiments, the network security system 105 can be eliminated and the risk score generator 110 can be implemented elsewhere in the computer network 100.

In some embodiments, the network security system 105 is a part of or otherwise associated with another system, such as, for example, a security operations center (SOC) or a critical incident response center (CIRC).

Additionally or alternatively, the network security system 105 can be part of or incorporate an otherwise conventional security analytics system, such as the RSA Security Analytics system commercially available from RSA, The Security Division of EMC Corporation of Hopkinton, Mass.

Other embodiments can implement the network security system 105 and its associated risk score generator 110 as part of or in conjunction with a security information and event management (SIEM), such as the enVision® platform, also commercially available from RSA. Additional details regarding SIEM systems can be found in, for example, U.S. patent application Ser. No. 12/982,288, filed Dec. 30, 2010 and entitled "Distributed Security Information and Event Management System with Application-Injected Remote Components," which is commonly assigned herewith and incorporated by reference herein.

In such embodiments, at least portions of the security logs 106 illustratively comprise security logs collected by the SIEM system.

An exemplary process utilizing risk score generator 110 in computer network 100 will now be described in more detail with reference to the flow diagram of FIG. 2. It is to be understood that this particular process is only an example, and additional or alternative processes can be carried out in other embodiments.

In this embodiment, the process includes steps 200 through 208. Steps 200, 202 and 208 are assumed to be performed by the risk score generator 110 in conjunction with determination of risk of malware infection in the host devices 102 of the computer network 100. Steps 204 and 206 are examples of device identification and proactive prevention steps assumed to be performed by the susceptible device identifier 116 and proactive malware infection prevention module 118, respectively, of the network security system 105.

In step 200, data characterizing the host devices 102 of the computer network 100 is obtained. As mentioned above, the computer network 100 is assumed to be associated with a particular company, organization or other enterprise, and is therefore also referred to herein as an "enterprise network." The data obtained in step 200 generally comprises data corresponding to a plurality of features incorporated by the logistic regression model 114. The data is obtained in the present embodiment by the host device data collector 112 from the security logs 106 and employee database 107 accessible to the network security system 105. In other embodiments, at least portions of the data obtained in step 200 can be obtained in other ways, such as directly from one or more of the host devices 102.

In step 202, the data obtained in step 200 is applied to the logistic regression model 114 of the risk score generator 110 to generate malware infection risk scores for respective ones of the host devices 102. The malware infection risk scores indicate likelihoods that the respective host devices 102 will become infected with malware. As noted above, the logistic regression model 114 incorporates a plurality of features of the host devices, and in this embodiment the incorporated features are assumed to include at least user demographic features, VPN activity features and web activity features of the host devices 102.

Examples of user demographic features incorporated by the logistic regression model 114 include one or more of user gender, user geographic location, user level in enterprise hierarchy and user technical level. These user demographic feature examples will be described in more detail below in conjunction with FIG. 4. At least portions of the data characterizing the host devices for the user demographic features are illustratively obtained from the employee database 107.

Examples of VPN activity features incorporated by the logistic regression model 114 include one or more of number of VPN connections, duration of VPN connections, amount of data sent over VPN connections and number of external network addresses of VPN connections. These VPN activity examples will be described in more detail below in conjunction with FIG. 5. At least portions of the data characterizing the host devices for the VPN activity features are illustratively obtained from the VPN logs 106-1.

Examples of the web activity features incorporated by the logistic regression model 114 include one or more of visited web site category features, web usage features and domain reputation features. These web activity feature examples will be described in more detail below in conjunction with FIGS. 6, 7 and 8.

As more particular examples, the visited web site category features may include one or more of number of chat sites visited, number of file transfer sites visited, number of freeware sites visited, number of gaming sites visited, number of social-networking sites visited, number of streaming sites visited and number of non-categorized sites visited. The web usage features may include number of distinct domains visited. The domain reputation features may include one or more of number of connections blocked by web proxy, number of connections challenged by web proxy, number of connections consented by web proxy and number of new domains visited.

At least portions of the data characterizing the host devices for the web activity features are illustratively obtained from the web proxy logs 106-2.

It should be appreciated that the above-noted user demographic features, VPN activity features and web activity features are presented by way of example only, and additional or alternative sets of features may be incorporated into the logistic regression model 114 in other embodiments. Also, embodiments of the invention are not limited to utilizing logistic regression models, and accordingly the logistic regression model 114 may be replaced in other embodiments with a linear model, a Poisson model or a Bayesian model.

In the present embodiment, the logistic regression model 114 incorporating the user demographic features, VPN activity features and web activity features of the host devices 102 can be generated in the risk score generator 110, or in another portion or portions of the network security system 105 or computer network 100. It is also possible for the logistic regression model 114 or portions thereof to be generated in an entirely separate system and downloaded into or otherwise provided to the risk score generator 110.

The logistic regression model 114 in some embodiments is generated by identifying potential malware infection related features of the host devices, obtaining data indicative of actual malware infection of particular ones of the host devices, determining correlations of the data indicative of actual malware infection with respective ones of the potential malware infection related features, selecting a subset of the potential malware infection related features based on the correlations, and configuring the logistic regression model to incorporate the selected subset of the potential malware infection related features. The data indicative of actual malware infection can be obtained, for example, from the anti-virus logs 106-3.

In step 204, a subset of the host devices 102 having malware infection risk scores above a specified threshold is identified. The subset of host devices can be determined, for example, as the top N host devices out of a total population of 10N or 100N host devices within an enterprise network. Accordingly, the threshold may be specified as the risk score that separates the top N host devices from the remaining host devices. Alternatively, the threshold may be specified as a particular risk score value that is predetermined before generation of the risk scores for the respective host devices.

In step 206, one or more proactive measures are taken to prevent malware infection in the identified subset of host devices 102.

Steps 204 and 206 in the present embodiment provide one example of a manner in which one or more proactive measures are taken to prevent malware infection in one or more of the host devices based at least in part on the malware infection risk scores. Other arrangements can be used to trigger proactive measures based at least in part on malware infection risk scores determined in the manner described herein.

By way of example, proactive measures applied to an identified subset of the host devices 102 can include one or more of the following:

1. Enterprises often deploy memory-scanning tools or other types of memory analysis tools on host devices. As use of these memory analysis tools is labor intensive, the tools are selectively deployed. The risk scores computed using the logistic regression model 114 allow an enterprise to apply memory analysis tools proactively to those host devices having the highest risk of malware infection, thereby conserving limited resources and improving the effectiveness of the tools in preventing malware infection.

2. Users of host devices having the highest risk scores can be warned and receive special training to avoid common pitfalls. More particularly, the risk scores can be used to develop a customized training procedure tailored to the observed user activity (e.g., employees visiting dangerous web site categories like gaming, freeware and streaming sites from their host devices can be instructed to avoid these activities).

3. Investigation of alerts generated by various security products deployed within the enterprise can be prioritized based on the host device risk scores. Incident response teams have limited capacity for handling security incidents, and prioritization of alerts can help in focusing on most relevant, highest-risk incidents.

The above are only examples of some types of proactive measures that can be taken based on malware infection risk scores, and numerous other types of proactive measures can be taken in other embodiments.

In step 208, the logistic regression model 114 is updated. For example, the model can be updated to reflect additional or alternative features associated with particular ones of the host devices 102 determined to have high malware infection risk scores relative to other ones of the host devices 102. This allows the model to be "tuned" over time to the particular security conditions facing a particular enterprise.

Additional instances of steps 200 through 208 can be performed on a regular basis or otherwise repeated periodically in order to ensure that the most vulnerable host devices continue to be targeted for proactive measures.

Numerous other techniques can be used to determine risk of malware infection for the host devices 102 based at least in part on one or more logistic regression models generated and applied in the manner described above.

Figure 2:
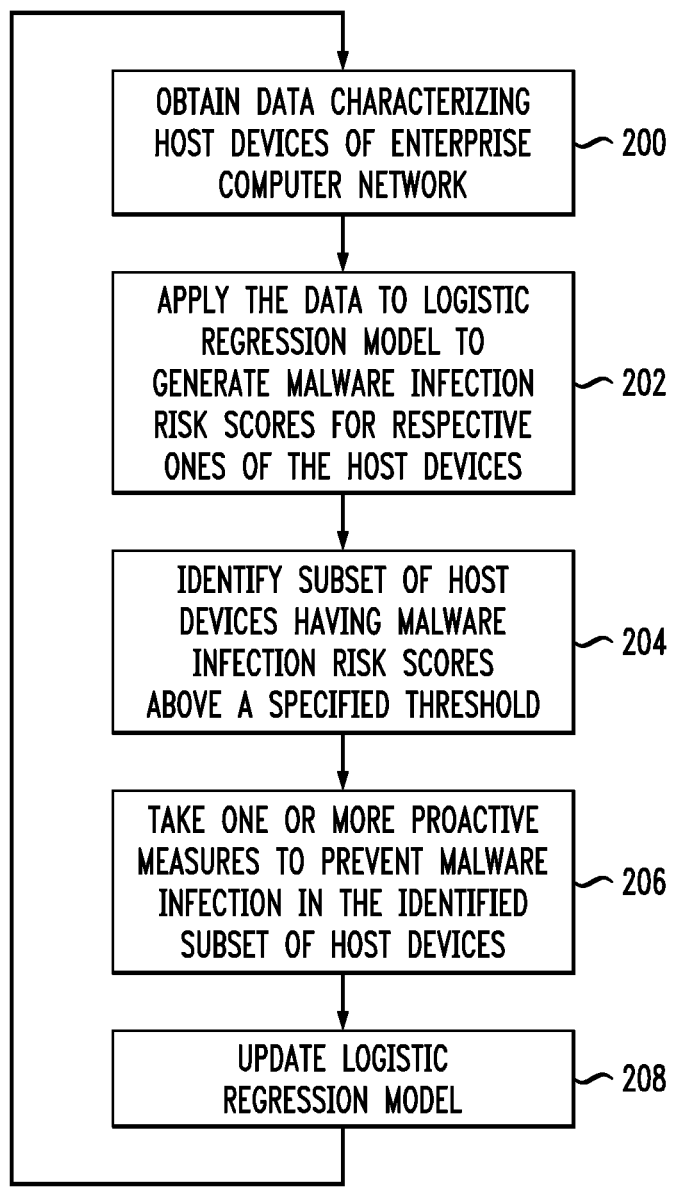
FIG. 2 is a flow diagram of an example process for determining risk of malware infection in enterprise hosts in the computer network of FIG. 1.

Accordingly, the particular processing operations and other network functionality described in conjunction with the flow diagram of FIG. 2 are presented by way of illustrative example only, and should not be construed as limiting the scope of the invention in any way. Alternative embodiments can use other types of processing operations to determine risk of malware infection for host devices of a computer network. For example, the ordering of the process steps may be varied in other embodiments, or certain steps may be performed concurrently with one another rather than serially. Also, as indicated previously, the process steps or subsets thereof may be repeated periodically in conjunction with respective distinct instances of malware infection risk determination.

A more detailed example of the manner in which logistic regression model 114 is generated will now be described with particular reference to tabular listings shown in FIGS. 3 through 9. The logistic regression model 114 in this particular example is generated at least in part utilizing actual data associated with a given enterprise, including history of actual malware infection for host devices of the enterprise as determined from anti-virus logs, as well as user demographic features derived from an actual employee database, and VPN activity and web activity features derived from VPN and web proxy logs. Again, it is to be appreciated that this particular logistic regression model is presented by way of example only, and other types of models incorporating other features can be used in other embodiments. Moreover, the models can of course vary based on the particular user demographic, VPN activity and web activity features that are determined to be statistically significant for a given enterprise based at least in part on actual malware infection data available for that enterprise.

The logistic regression model 114 in this example is generated at least in part based on information collected in security logs 106 and employee database 107. As will be described, this information is used by the risk score generator 110 to determine the likelihood that particular ones of the hosts 102 will become infected with malware.

FIG. 3 illustrates data obtained from the anti-virus logs 106-3 in an illustrative embodiment. This data includes anti-virus reports that include a host name, a virus name, a file path, a detection time and a reporting time. Such reports are generated by anti-virus agents deployed on the hosts 102 and upon generation are sent to the network security system 105 for storage in the anti-virus logs 106-3.

The host name provides a fully-qualified domain name that serves as a unique identifier for the end host on the enterprise network. The virus name indicates the name of the identified threat, illustratively a malware infection threat in the present embodiment. It should be noted in this regard that the term "malware" as used herein is intended to be broadly construed, and should not be viewed as limited to malware that is spread or otherwise deployed through viruses each comprising one or more malicious files. The file path provides information characterizing the full path of a given such malicious file.

The detection time and reporting time provide respective timestamps of the time of detection of the identified threat on the host, and the time of collection at an enterprise data collection server. Such an enterprise data collection server, although not specifically shown in the computer network 100 of FIG. 1, could be implemented, for example, as a part of the network security system 105, or as a separate server coupled to the network 104.

It is to be appreciated that the particular anti-virus report format shown in FIG. 3 is presented by way of example only, and other types of information stored in anti-virus logs 106-3 can be used in other embodiments.

The anti-virus reports of FIG. 3 are utilized to identify those host devices that have actually become infected with malware within a designated time period, such as a specified monitoring period, in order to determine correlation between particular features of the host devices and actual malware infection in generating the logistic regression model 114.

The logistic regression model 114 in this embodiment comprises a predictive model that assigns risk scores to respective ones of the host devices 102 in the enterprise based on information derived from user demographic information and observed behavior in the network. As indicated previously, the model utilizes three categories of features, namely, user demographic features, VPN activity features and web activity features. As will be described in more detail in conjunction with FIGS. 4 through 9 below, these features include numeric values (e.g., number of VPN logins), categorical features (e.g., country where the user is located), and other types of features. Although some features are static (e.g., user country and job type), most vary over time (e.g., number VPN logins or number of domains visited).

Although other types of models can be used in other embodiments, the model in the present embodiment is a predictive model based on logistic regression. Logistic regression is used to estimate a conditional probability $\Pr(Y|X)$ of a binary response variable Y given a set of input variables $X=(X_1 \ldots X_n)$. The model assumes that $\Pr(Y|X)$ is the logistic function and estimates one or more unknown parameters using maximum likelihood. More particularly, let $p(\vec{x})=\Pr(Y=1|X=\vec{x})$, for a feature vector $\vec{x}=(x_1 \ldots, x_n)$. Logistic regression in this embodiment assumes that:

$$\log\frac{p(\vec{x})}{1-p(\vec{x})} = \alpha + \beta \cdot \vec{x},$$

where $\alpha$ is an intercept, $\beta=(\beta_1, \ldots \beta_n)$, are regression coefficients for the respective features and $\beta \cdot \vec{x}$ denotes the scalar product of vectors $\beta$ and $\vec{x}$.

The response variable Y is modeled as a random variable with value 1 if the host encountered malware, and 0 otherwise, where the term "malware encounter" as used herein is intended to refer generally to an exposure of a host to a potential malware infection rather than to an actual malware infection of the host. Input variables $X=(X_1, \ldots, X_n)$ denote a combination of user demographic features, VPN activity features and web activity features, selected in the manner described below.

A two-stage feature selection process is used to identify the most relevant features for the logistic regression model 114. In the first stage, instances of the model are built and evaluated separately for each category of potential features against the actual malware infection data with the goal of finding the most statistically significant features for predicting future malware encounters. In the second stage, the statistically significant features determined in the first stage are combined to build the final model.

The logistic regression computations are illustratively implemented using the generalized linear model (glm) function of the R statistical computing environment, described in "The R Project for Statistical Computing," www.r-project.org. Based on training data comprising the above-noted actual malware infection data, as derived from anti-virus reports of the type shown in FIG. 3, glm outputs estimates of the intercept a and regression coefficients $\beta_i$, as well as standard errors for estimation.

For each feature i, glm also computes a p-value for the hypothesis that the regression coefficient $\beta_i$ is zero, implemented using a standard Wald test. A low p-value indicates that the null hypothesis can be rejected with high confidence, implying that the corresponding feature is relevant in the model.

FIGS. 4 through 8 show tabular listings of various potential features, as well as estimated regression coefficient, standard error, p-value for the hypothesis that the regression coefficient is zero, and significance level for each such feature.

Significance levels of 0.001, 0.01 and 0.05 are denoted in the right-most columns of the tabular listings in FIGS. 4 through 8 by *, , and *; a dot (.) denotes a 0.1 significance level; and no star or dot means the feature is not found significant.

For categorical (i.e., discrete) variables, R employs the following encoding scheme. Assume that a variable V takes m possible values $v_1, \ldots v_m$. Then R encodes this with m–1 binary variables $Z_1, \ldots Z_{m-1}$. Value $V=v_i$ for $i \in \{1, \ldots, m-1\}$ is encoded with $Z_i=1$ and all other $Z_j$ binary variables set at 0, for $j \neq i$. Value $V=v_m$ is encoded with all variables $Z_i$ set at 0, for $i \in \{1, \ldots, m-1\}$. The value $v_m$ is called the "reference value" for V.

Referring now to FIG. 4, examples of user demographic information derived from the employee database 107 are shown. It is assumed that the employee database 107 stores information about each employee of the enterprise, including employee name, employee ID number, office location, business unit, job title, and manager ID number.

Additional user demographic information to be considered as potential features for incorporation in the model can be inferred from this stored information. For example, assume the enterprise comprises a company in which employees can be viewed as being organized into a hierarchy of different jobs with varying levels of management responsibility. From one or more job titles, job type can be categorized using the primary word in the job title after stripping away level indicators (e.g., "engineer I" and "engineer II" are both considered "engineer"). Also, given employee manager ID numbers, an organization tree can be built with the company CEO as its root. This allows a "level" to be assigned to each employee based on the number of steps down from the tree root.

The particular user demographic features considered in FIG. 4 include features denoted as Gender, Country, Level and Technical.

Assuming the employee database 107 does not include gender information, the Gender feature can be inferred from the employees' first names, for example, using data from the U.S. census bureau, with the remaining users labeled as having "unknown" gender.

The Country feature indicates the country in which the user's office is located. The countries are illustratively ordered by number of employees.

The Level feature indicates level in the management hierarchy determined using the organization tree described above.

The Technical feature provides a measure of the technical level of the user's job type. More particularly, the Technical feature in the present embodiment is a binary variable inferred from the job title, set to 1 for "Engineer," "Architect," "Specialist," and "Administrator," and 0 for all other job types.

FIG. 4 shows the significance of each of the potential user demographic features, and more particularly estimated coefficients for each feature, the standard error, the p-value for the hypothesis that the regression coefficient is zero, and the significance level. For categorical features Gender and Country, values Female and Australia, respectively, were chosen as the reference values by the glm function, and as such are not explicitly included in the figure. The Gender, Level and Technical features, as well as many of the Country features, have low p-values and are considered statistically significant. The estimated coefficient is correlated with the malware infection risk of that feature, indicating that India has the highest infection risk, while Japan has the lowest. Six countries (Japan, Ireland, Netherlands, Germany, UK, US) have negative estimated coefficients indicating negative correlation with malware encounters. Another six countries have estimated coefficients close to 0, suggesting no statistical significance regarding risk of malware infection.

FIG. 5 shows potential VPN activity features. These are illustratively derived from the VPN logs 106-1 of the computer network 100. A VPN generally allows remote users to establish a secure communication channel to an internal portion of an enterprise network. For each VPN session, a VPN server records the username that logged in, the fully-qualified domain name of the host used to log in, the time of login, the duration of the VPN session, the number of bytes sent and received during the session, and the external IP address from which the login was made. Such information can provide, for example, an approximation of how often a given portable host device is brought outside of the enterprise to a remote location, and how it is used while outside of the enterprise.

The features shown in FIG. 5 more particularly comprise VPN_conn (total number of connections over a monitoring period), VPN_dur (total duration of all VPN connections in seconds), VPN_sbytes (sum of bytes sent in VPN connections), VPN_rbytes (sum of bytes received in VPN connections), and VPN_extip (number of distinct external IP addresses from which VPN connections are initiated). One or more of these features are based at least in part on a recognition that users connecting from many different external IP addresses visit multiple networks, and can be exposed to more attack vectors. The features are aggregated over a designated monitoring period.

Almost all of the VPN activity features shown in FIG. 5 are highly significant in estimating the conditional probability of malware encounters. The estimated coefficients are proportional to the average value of each feature. For instance, the average VPN_sbytes value is 5.26e-09, while the average VPN_extip value is 8.88. Surprisingly, VPN_dur is the only feature negatively correlated with malware encounters (i.e., users exhibiting less total time in VPN sessions are at higher risk). One possible explanation is that users who bring their host devices outside of the enterprise often, but spend less time on VPN, are more exposed to threats since they may lack protection by certain enterprise security products while outside of the enterprise.

Examples of web activity features will now be described with reference to FIGS. 6-8. In addition to anti-virus software, an enterprise network may deploy a variety of other security tools to prevent unwanted software and intrusions. For example, a web proxy such as Cisco IronPort can be used to filter HTTP and HTTPS requests. The web proxy vendor provides reputation scores and category information (e.g., business, news, sports), for known web sites, and the filtering policy blocks connections to web sites with low reputation scores or in non-business-related categories.

In cases where a web request is made to a previously unknown web site lacking reputation and category, the proxy instead displays a warning page to the user, stating that the site is considered higher risk. The user is asked to acknowledge that access to the site adheres to the company's security policies before being allowed to proceed. Once the user has acknowledged, the consent is valid for one hour. During this time, visits to other non-categorized web sites are allowed without further prompting from the proxy.

Various aspects of users' web behavior are potentially correlated with malware encounters, including features related to categories of web sites visited, aggregate volumes of web traffic, and connections to blocked or low-reputation sites.

FIG. 6 illustrates potential features for categories of web sites visited. As noted above, the web proxy vendor classifies web sites into categories. For each host, the web proxy counts the total number of HTTP connections to each category of interest, including chat, entertainment, file transfer, filtering, freeware, gaming/gambling, online storage and backup, peer-to-peer, social networks, online mail, streaming, business, travel and non-categorized sites. Non-categorized sites are those that are new and yet to receive a category label. The results for significance of web site category features in FIG. 6 show that only seven web site categories are statistically significant in the predictive model. Non-categorized sites have the highest risk, followed by social networks, chat, file transfer, and freeware sites.

FIG. 7 illustrates potential features measuring the aggregate volume of web traffic generated by each host. One or more of these features are based at least in part on a recognition that higher Internet exposure could potentially result in higher likelihood of encountering web-based malware. The potential features include: No_conn (total number of web connections over the monitoring period), No_doms (number of distinct domains visited by the host), rbytes (sum of the bytes received in all web connections), and sbytes (sum of the bytes sent in all web connections). As indicated in the figure, only the number of distinct domains visited by the host is strongly correlated with the probability of encountering malware.

FIG. 8 illustrates potential features for blocked and low-reputation domains. Accessing blocked or low-reputation sites might be indicative of risky activity. For each host, counts are determined for the number of web connections blocked by the proxy (Blocked), the number of connections to non-categorized sites that required explicit user agreement (Challenged), and the number of connections to non-categorized sites to which the user explicitly consented (Consented).

In addition, a history of all external destinations visited by enterprise hosts is maintained over a designated time interval, such as three months. This history is updated daily to account for newly visited domains. Connections to new domains, i.e., those that have not been visited before by any host in the enterprise, are also possible indicators of suspicious activity. For each host, the number of new domains visited each day are counted, and then these values are aggregated over the monitoring period into a feature called New_domains.

The figure indicates that all of these features are highly significant in the logistic regression model, but the most significant are visits to new domains (New_domains) and number of non-categorized sites requiring user agreement (Challenged).

The final version of logistic regression model 114 in the present embodiment combines the features found to be statistically significant in the above analyses. The selected features and their respective descriptions are shown in FIG. 9.

A chi-squared goodness-of-fit test was performed to test the hypothesis that the final model fits the available data, and obtained a very high p-value (i.e., a p-value close to 1), implying that the null hypothesis cannot be rejected. This finding provides a measure of confidence that the model is a good fit to the selected features characterizing user demographics, VPN activity and web activity.

As mentioned previously, the particular logistic regression model comprising particular user demographic, VPN activity and web activity features as described above is determined based on actual enterprise data available from a particular enterprise, and other embodiments can utilize alternative models. For example, the particular features determined to be statistically significant may vary depending upon the particular configuration and other characteristics of a given enterprise as reflected in its available enterprise data.

In order to further evaluate the effectiveness of the logistic regression model approach described above, the hosts of the particular enterprise were randomly separated into two equal-size training and testing sets. The logistic regression model was generated using available data for the hosts in the training set, and then the model was applied to generate risk scores for the hosts in the testing set. This process was repeated for multiple independent runs, with each run first randomly separating the hosts into training and testing sets, then generating the model based on available data for the hosts in the training set, and finally applying the model to generate risk scores for the hosts in the testing set. It was found that over the multiple runs the hosts with the highest risk scores encountered malware at a rate approximately three times that of the general population of host devices within the enterprise.

Illustrative embodiments of the invention advantageously provide malware infection risk determination techniques that are particularly efficient and easy to implement. For example, certain embodiments provide simple and effective determination of risk of malware infection utilizing security logs already being collected by an SIEM system or other type of network security system. The logistic regression model in some embodiments estimates the conditional probability of a particular enterprise host encountering malware given the feature values for that host at a particular moment in time. The risk score determination based on the logistic regression model can be run on a regular basis to determine the hosts that are most at risk of infection and take early proactive measures for those hosts. Such an arrangement allows a network security system to prioritize its available proactive measures in a manner that conserves limited resources, resulting in improved performance and enhanced security.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of security logs, databases, risk scores, predictive models and proactive malware infection prevention processes may be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:
1. A method comprising steps of:
obtaining data characterizing host devices of a computer network of an enterprise;
applying the data to a logistic regression model to generate malware infection risk scores for respective ones of the host devices; and
taking one or more proactive measures to prevent malware infection in one or more of the host devices based at least in part on the malware infection risk scores;
wherein the malware infection risk scores indicate likelihoods that the respective host devices will become infected with malware;
wherein the logistic regression model incorporates a plurality of features of the host devices as respective model variables including at least user demographic features, virtual private network (VPN) activity features and web activity features of the host devices;
wherein the user demographic features incorporated by the logistic regression model comprise at least one of user level in enterprise hierarchy and user technical level;
wherein the VPN activity features incorporated by the logistic regression model comprise number of VPN connections and duration of the VPN connections;
wherein the web activity features incorporated by the logistic regression model comprise web usage features and domain reputation features, the web usage features comprising number of distinct domains visited and the domain reputation features comprising number of connections challenged by web proxy and number of connections consented by web proxy;
wherein the data characterizing the host devices comprises data for the plurality of features incorporated by the logistic regression model; and
wherein the steps are performed by at least one processing device comprising a processor coupled to a memory.

2. The method of claim 1 wherein taking one or more proactive measures further comprises:
identifying a subset of the host devices having malware infection risk scores above a specified threshold; and
applying the one or more proactive measures to the host devices in the subset but not to the host devices outside of the subset.

3. The method of claim 1 wherein the user demographic features incorporated by the logistic regression model further comprise one or more of user gender and user geographic location.

4. The method of claim 1 wherein the data characterizing the host devices for the user demographic features is obtained at least in part from one or more employee databases of the enterprise.

5. The method of claim 1 wherein the VPN activity features incorporated by the logistic regression model further comprise one or more of amount of data sent over VPN connections and number of external network addresses of VPN connections.

6. The method of claim 1 wherein the data characterizing the host devices for the VPN activity features is obtained at least in part from VPN logs of the enterprise.

7. The method of claim 1 wherein the web activity features incorporated by the logistic regression model further comprise visited web site category features.

8. The method of claim 7 wherein the visited web site category features comprise one or more of number of chat sites visited, number of file transfer sites visited, number of freeware sites visited, number of gaming sites visited, number of social-networking sites visited, number of streaming sites visited and number of non-categorized sites visited.

9. The method of claim 7 wherein the domain reputation features further comprise one or more of number of connections blocked by web proxy and number of new domains visited.

10. The method of claim 1 wherein the data characterizing the host devices for the web activity features is obtained at least in part from web proxy logs of the enterprise.

11. The method of claim 1 further comprising generating the logistic regression model.

12. The method of claim 11 wherein generating the logistic regression model comprises:

identifying a plurality of potential malware infection related features of the host devices;
obtaining data indicative of actual malware infection of particular ones of the host devices;
determining correlations of the data indicative of actual malware infection with respective ones of the potential malware infection related features;
selecting a subset of the potential malware infection related features based on said correlations; and
configuring the logistic regression model to incorporate the selected subset of the potential malware infection related features as said plurality of features of the host devices incorporated by the logistic regression model.

13. The method of claim 12 wherein obtaining data indicative of actual malware infection comprises obtaining that data at least in part from anti-virus logs of the enterprise.

14. An article of manufacture comprising a processor-readable storage medium having stored therein program code of one or more software programs, wherein the program code when executed by at least one processing device causes said at least one processing device:
to obtain data characterizing host devices of a computer network of an enterprise;
to apply the data to a logistic regression model to generate malware infection risk scores for respective ones of the host devices; and
to take one or more proactive measures to prevent malware infection in one or more of the host devices based at least in part on the malware infection risk scores;
wherein the malware infection risk scores indicate likelihoods that the respective host devices will become infected with malware;
wherein the logistic regression model incorporates a plurality of features of the host devices as respective model variables including at least user demographic features, virtual private network (VPN) activity features and web activity features of the host devices;
wherein the user demographic features incorporated by the logistic regression model comprise at least one of user level in enterprise hierarchy and user technical level;
wherein the VPN activity features incorporated by the logistic regression model comprise number of VPN connections and duration of the VPN connections;
wherein the web activity features incorporated by the logistic regression model comprise web usage features and domain reputation features, the web usage features comprising number of distinct domains visited and the domain reputation features comprising number of connections challenged by web proxy and number of connections consented by web proxy; and
wherein the data characterizing the host devices comprises data for the plurality of features incorporated by the logistic regression model.

15. An apparatus comprising:
at least one processing device comprising a processor coupled to a memory;
said at least one processing device being configured:
to obtain data characterizing host devices of a computer network of an enterprise;
to apply the data to a logistic regression model to generate malware infection risk scores for respective ones of the host devices; and
to take one or more proactive measures to prevent malware infection in one or more of the host devices based at least in part on the malware infection risk scores;
wherein the malware infection risk scores indicate likelihoods that the respective host devices will become infected with malware;
wherein the logistic regression model incorporates a plurality of features of the host devices as respective model variables including at least user demographic features, virtual private network (VPN) activity features and web activity features of the host devices;
wherein the user demographic features incorporated by the logistic regression model comprise at least one of user level in enterprise hierarchy and user technical level;
wherein the VPN activity features incorporated by the logistic regression model comprise number of VPN connections and duration of the VPN connections;
wherein the web activity features incorporated by the logistic regression model comprise web usage features and domain reputation features, the web usage features comprising number of distinct domains visited and the domain reputation features comprising number of connections challenged by web proxy and number of connections consented by web proxy; and
wherein the data characterizing the host devices comprises data for the plurality of features incorporated by the logistic regression model.

16. The apparatus of claim 15 wherein the data characterizing the host devices for the user demographic features is obtained at least in part from one or more employee databases of the enterprise.

17. The apparatus of claim 15 wherein the data characterizing the host devices for the VPN activity features is obtained at least in part from VPN logs of the enterprise.

18. The apparatus of claim 15 wherein the data characterizing the host devices for the web activity features is obtained at least in part from web proxy logs of the enterprise.

19. A network security system comprising the apparatus of claim 15.

20. The article of manufacture of claim 14 wherein the program code when executed by said at least one processing device further causes said at least one processing device to generate the logistic regression model by:
identifying a plurality of potential malware infection related features of the host devices;
obtaining data indicative of actual malware infection of particular ones of the host devices;
determining correlations of the data indicative of actual malware infection with respective ones of the potential malware infection related features;
selecting a subset of the potential malware infection related features based on said correlations; and
configuring the logistic regression model to incorporate the selected subset of the potential malware infection related features as said plurality of features of the host devices incorporated by the logistic regression model.

* * * * *